United States Patent
Denton

[15] 3,690,174
[45] Sept. 12, 1972

[54] LIQUID LEVEL GAGE
[72] Inventor: Ronald T. Denton, Birmingham, Mich.
[73] Assignee: Ford Motor Company, Dearborn, Mich.
[22] Filed: Nov. 4, 1970
[21] Appl. No.: 86,878

[52] U.S. Cl. .................................. 73/323, 73/119 R
[51] Int. Cl. .............................................. G01f 23/02
[58] Field of Search ........................... 73/323, 119 R

[56] References Cited

UNITED STATES PATENTS

| | | | |
|---|---|---|---|
| 1,156,998 | 10/1915 | Heberling | 73/323 |
| 3,103,816 | 9/1963 | Kawecki | 73/323 |
| 3,062,049 | 11/1962 | Javor | 73/323 |
| 2,755,629 | 7/1956 | Baisch | 73/323 X |

*Primary Examiner*—Louis R. Prince
*Assistant Examiner*—Daniel M. Yasich
*Attorney*—John R. Faulkner and Roger E. Erickson

[57] ABSTRACT

A gage to indicate the level of liquid within an enclosed, vented container, such as a carburetor fuel bowl. The gage includes a double reversed tube, a depending end of which is inserted into the container and the other end of which is equipped with a suction device for drawing liquid from the container into the tube. Upon venting the drawn liquid within the tube to the atmosphere, the liquid level within the tube becomes identical to that within the container.

6 Claims, 2 Drawing Figures

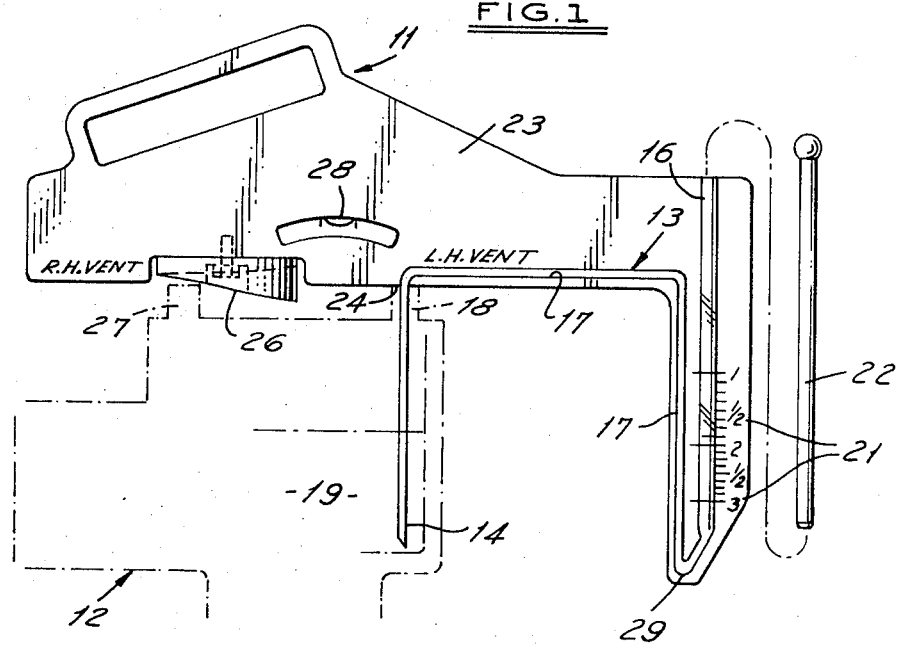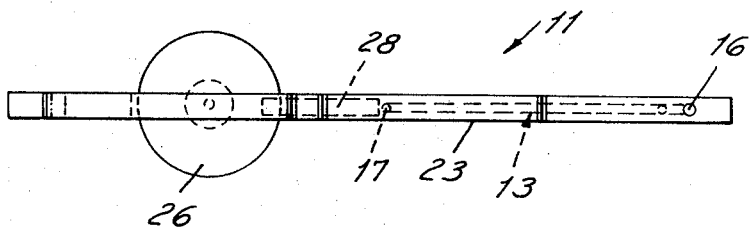

LIQUID LEVEL GAGE

BACKGROUND OF THE INVENTION

An improper level of fuel within the fuel bowl of a carburetor can result in engine "surge" or "stumble" from too lean operation. However, an accurate diagnosis of this is often difficult because several other engine maladjustments or conditions such as improper timing, a manifold vacuum leak or an inoperative positive crankcase ventilation valve, will cause similar engine symptoms.

As an initial step in attempting to locate the cause of engine trouble, an auto mechanic or technician often partially disassembles the carburetor to check the level of fuel within the carburetor fuel bowl and to determine whether the float is properly adjusted. Such a check is costly insofar as it is a time-consuming operation.

This invention provides an apparatus and a method to accurately determine fuel level within a carburetor fuel bowl without having to disassemble the carburetor. Further, this invention provides an economical as well as a simple means to determine the liquid level within an enclosed, vented container.

SUMMARY OF THE INVENTION

A gage to indicate liquid level within an enclosed, vented container constructed in accordance with this invention includes a double reversed or generally S-shaped tube member having a depending end immersible in the liquid to be measured, a suction means on the other end of the tube member constructed to draw liquid from the container into the tube member, and vent means to selectively communicate the liquid within the tube member with the atmosphere.

BRIEF DESCRIPTION OF THE DRAWINGS

FIG. 1 illustrates a front elevational view of a preferred embodiment of the invention. An automotive carburetor is shown in phantom.

FIG. 2 illustrates a top view of the apparatus shown in FIG. 1.

DETAILED DESCRIPTION OF THE PREFERRED EMBODIMENT

A liquid level gage 11 constructed in accordance with this invention is shown in FIG. 1 of the drawing positioned upon a typical automotive carburetor 12, shown in phantom. The gage includes a double reversed tube 13 having at one end a depending portion 14, at the other end an upstanding portion 16 and an intermediate portion 17 therebetween. The depending end portion 14 is insertable through the conventional internal bowl vent passage 18 of the carburetor into the fuel bowl 19. The upstanding portion 16 of the tube member has a relatively larger diameter that includes vertically spaced graduations 21. A piston means 22 is receivable within the upstanding portion and as it is withdrawn creates a suction within the tube member which draws fuel through the depending portion into the remainder of the tube member.

The tube member 13 is mounted on a frame 23. The frame includes a first abutment portion 24 adjacent the depending end of the tube assembly which engages a first vent 18 of the carburetor. A cam 26 is rotatably mounted to the frame and is engageable with a second vent 27 of the carburetor 12. A bubble-type level indicator 28 is incorporated within the frame 23. The cam wheel is rotated against the right-hand vent 27 until the bubble indicator shows a level condition. The graduations 21 on the upstanding end portion of the tube member are correlated with the abutment 24 so that when the bubble indicator registers a level condition, the fluid level within the upstanding portion 16 indicates the fluid level within the carburetor fuel bowl 19.

OPERATION

To obtain a fuel level reading by means of the subject gage, the depending portion 14 of the tube member 13 is inserted through the bowl vent 18 of the carburetor 12 into the liquid fuel until abutment portion 24 engages vent 18. While the tube is being inserted into the fuel, the piston means 22 is fully received within the upstanding portion 16 of the tube member. As the piston means is withdrawn from the tube member, a reduced air pressure condition is created within the tube member causing the atmospheric pressure acting on the fuel surface in the bowl 19 to force fuel up into the tube member, eventually into the upstanding portion. The diameter of the upstanding portion 16 relative to the diameter of the depending and intermediate portions 14 and 17 is so constructed that withdrawal of the piston means will draw in an amount of fuel which at least will reach point 29 of the tube member 13. It should be noted that point 29 is lower than the open end of depending portion 14 of the tube member, thus assuring siphon action within tube member 13. At the time the piston means is completely withdrawn from the upstanding portion of the tube member and it becomes vented, a siphon arrangement is created causing the fuel within the carburetor bowl and the fuel within the upstanding portion of the tube member to seek an identical, equilibrium level. When the fuel within the tube member 13 has reached its equilibrium position and the frame 23 has been leveled by means of the cam wheel 26 and level indicator 28, the fuel level within the upstanding portion 16 is identical to the fuel level within the carburetor bowl 19. The graduations 21 of the upstanding tube portion are correlated with the abutment 24 for a particular carburetor to give an accurate, usable fuel level reading.

Modifications and alterations will occur to those skilled in the art which are included in the scope of the following claims.

I claim:

1. A gage to indicate liquid level comprising:
    a double reversed tube member having a depending end portion immersible in the liquid to be measured and an intermediate portion elevated above the level of the liquid,
    a suction means at the other end portion of the tube member constructed to draw liquid from the container over said elevated intermediate portion and into the other end portion of the tube member,
    vent means to selectively connect said other end portion of the tube member with the atmosphere, whereby the level of the liquid in said other end portion of said tube member when said other end portion is vented to the atmosphere is indicative of said liquid level.

2. A gage according to claim 1 and including:
said suction means comprising
a piston means slidingly and sealingly received within the other end portion of said tube member,
said piston means being withdrawable from said other end portion causing liquid from the container to be drawn through said depending end portion into other portions of the tube member.

3. A gage according to claim 1 and including:
vertically spaced graduations on said other end portion,
leveling means to indicate the position of said tube member relative to the horizontal and correlate said graduations and the liquid level within said container.

4. A gage to indicate fuel level within the fuel bowl of a carburetor having a vent passage to the atmosphere comprising:
a double reversed tube member having a depending first end portion and an upstanding second end portion,
said first end portion being insertable through said vent passage into said fuel bowl,
a piston means slidingly and sealingly received within the upstanding end portion of the tube member,
said piston being withdrawable from said upstanding end portion to cause liquid from the container to be drawn into said upstanding end portion,
abutment means engageable with said carburetor, said abutment means including an adjustable member,
means to indicate the position of said tube member relative to the horizontal,
vertically spaced graduations on said upstanding end portion,
said adjustable member being movable relative to said tube member to position said tube member and correlate said graduations with the fuel level within said fuel bowl.

5. A method of determining the liquid level in an enclosed, vented container by means of a double reversed tube member having a depending end portion within the liquid, an upstanding end portion and intermediate portions therebetween, said method comprising:
withdrawing by means of suction a quantity of liquid from the container into said depending and intermediate portions of the tube member,
venting said liquid through the upstanding portion to the atmosphere causing siphoning action to establish a liquid level within the upstanding portion identical to the liquid level within the container.

6. A gage to indicate liquid level within a container comprising:
a double reversed tube member having a first depending portion opening at its lower end and being immersible into the liquid to be measured, a second portion extending generally upwardly at least past the level of liquid to be measured and opening at its upper end, and an intermediate portion interconnecting the first portion of said tube member and the lower end of said second portion,
suction means positioned on said second portion constructed to draw liquid from the container into the tube member including the second portion thereof,
vent means to selectively connect the upper end of said second portion to the atmosphere.

* * * * *